(12) United States Patent
Zoetelief et al.

(10) Patent No.: US 11,168,227 B2
(45) Date of Patent: Nov. 9, 2021

(54) FUSED FILAMENT PRINTING

(71) Applicant: Covestro (Netherlands) B.V., Nieuwegein (NL)

(72) Inventors: Wilhelmus Frederikus Zoetelief, Echt (NL); Alexander Antonius Marie Stroeks, Echt (NL); Patrick Gerardus Duis, Echt (NL)

(73) Assignee: Covestro (Netherlands) B.V., Nieuwegein (NL)

( * ) Notice: Subject to any disclaimer, the term of this patent is extended or adjusted under 35 U.S.C. 154(b) by 75 days.

(21) Appl. No.: 16/080,389

(22) PCT Filed: Mar. 10, 2017

(86) PCT No.: PCT/EP2017/055711
§ 371 (c)(1),
(2) Date: Aug. 28, 2018

(87) PCT Pub. No.: WO2017/153586
PCT Pub. Date: Sep. 14, 2017

(65) Prior Publication Data
US 2019/0062577 A1    Feb. 28, 2019

(30) Foreign Application Priority Data
Mar. 11, 2016    (EP) .................... 16159905

(51) Int. Cl.
*B29C 41/02*    (2006.01)
*C09D 11/102*    (2014.01)
(Continued)

(52) U.S. Cl.
CPC .......... *C09D 11/102* (2013.01); *B29C 64/118* (2017.08); *B29C 64/209* (2017.08);
(Continued)

(58) Field of Classification Search
CPC .............. B29C 64/118; B29K 2077/00; B29K 2995/004; B33Y 10/00; B33Y 70/00
(Continued)

(56) References Cited

U.S. PATENT DOCUMENTS

| 8,920,697 B2 | 12/2014 | Mikulak et al. |
| 2009/0236775 A1 | 9/2009 | Monsheimer et al. |

(Continued)

FOREIGN PATENT DOCUMENTS

| CN | 102015842 | 4/2011 |
| CN | 104487230 | 4/2015 |

(Continued)

OTHER PUBLICATIONS

International Search Report and Written Opinion of the ISA for PCT/EP2017/055711, dated May 22, 2017, 14 pages.

*Primary Examiner* — Leo B Tentoni
(74) *Attorney, Agent, or Firm* — Daniel S. Bujas

(57) ABSTRACT

The invention relates to a method for forming a three-dimensional object by fused filament fabrication comprising the step of selectively dispensing a polymer composition containing a semi-crystalline copolyamide in accordance with the shape of a portion of a three-dimensional object, characterized that the semi-crystalline copolyamide comprises: a) At least 70 wt. % of aliphatic monomeric units derived from i. Aminoacid A, or ii. diamine B and diacid C, and b) At least 0.5 wt. % of further monomeric units derived from a cyclic monomer, wherein wt. % is with respect to the total weight of the semi-crystalline copolyamide. The invention relates also relates to objects attainable by this method and to the use of the said semi-crystalline copolyamide in fused filament fabrication.

18 Claims, 3 Drawing Sheets

(51) Int. Cl.
    *C08G 69/36*     (2006.01)
    *B33Y 70/00*     (2020.01)
    *B33Y 30/00*     (2015.01)
    *B29C 64/118*     (2017.01)
    *C08L 77/06*     (2006.01)
    *C08L 77/02*     (2006.01)
    *C08G 69/26*     (2006.01)
    *B33Y 10/00*     (2015.01)
    *B29C 64/209*     (2017.01)
    *B33Y 80/00*     (2015.01)
    *B29K 77/00*     (2006.01)

(52) U.S. Cl.
    CPC .............. *B33Y 10/00* (2014.12); *B33Y 30/00* (2014.12); *B33Y 70/00* (2014.12); *C08G 69/265* (2013.01); *C08G 69/36* (2013.01); *C08L 77/02* (2013.01); *C08L 77/06* (2013.01); *B29K 2077/00* (2013.01); *B29K 2995/004* (2013.01); *B33Y 80/00* (2014.12)

(58) Field of Classification Search
    USPC ............................................ 264/308, 331.19
    See application file for complete search history.

(56) References Cited

U.S. PATENT DOCUMENTS

| | | |
|---|---|---|
| 2011/0172387 A1 | 7/2011 | Filou |
| 2012/0231225 A1 | 9/2012 | Mikulak |
| 2014/0141166 A1* | 5/2014 | Rodgers ................ B29C 64/118 427/256 |
| 2015/0152233 A1 | 6/2015 | Corriol |
| 2016/0312022 A1* | 10/2016 | Niessner ................ B33Y 10/00 |
| 2017/0066954 A1* | 3/2017 | Chua ...................... B33Y 10/00 |
| 2020/0048414 A1* | 2/2020 | Qi ......................... B29C 64/118 |

FOREIGN PATENT DOCUMENTS

| | | | |
|---|---|---|---|
| JP | 2014523942 | 9/2014 | |
| KR | 20110009191 A | 1/2011 | |
| WO | 2009/138692 | 11/2009 | |
| WO | 2013001006 A1 | 1/2013 | |
| WO | 2014/081594 | 5/2014 | |
| WO | 2015/019212 | 2/2015 | |
| WO | 2015081009 | 6/2015 | |
| WO | WO-2015091817 A1 * | 6/2015 | ............. B33Y 10/00 |
| WO | 2016004985 A1 | 1/2016 | |
| WO | 2016012486 | 1/2016 | |

* cited by examiner

FUSED FILAMENT PRINTING

This application is the U.S. national phase of International Application No. PCT/EP2017/055711 filed 10 Mar. 2017, which designated the U.S. and claims priority to EP Patent Application No. 16159905.5 filed 11 Mar. 2016, the entire contents of each of which are hereby incorporated by reference.

This invention relates to a method for forming a three-dimensional object by fused filament fabrication, as well as objects obtainable by fused filament fabrication and use of a semi-crystalline copolyamide in fused filament fabrication.

In recent years there has been an enormous development in terms of additive manufacturing technologies and materials for making three-dimensional objects. One such a technique is selective powder sintering (SLS), another technique is fused filament fabrication (FFF).

Selective powder sintering in general comprises the steps of applying a first thin layer of polymeric powder on a substrate, selectively sintering the powder to obtain a pattern of sintered powder, building up subsequent layers in the same way, and selectively sintering the powder to form a pattern of sintered powder in each layer, adhering to the pattern of the under-laying layer and finally separating the un-sintered powder from the sintered powder to obtain a polymeric shaped object. In complex shapes comprising small voids or closed hollow parts, it may be difficult or even impossible to remove unsintered powder from such voids and hollow parts.

In fused filament fabrication (FFF), also referred to as fused deposition modeling (FDM), the three-dimensional shape is formed by building patterns from molten polymeric material in subsequent layers wherein each layer is solidified before a next layer of molten material is applied. The advantage of FFF over SLS is that the resulting product is a net-shaped product, i.e. all material applied is intended to be integrated in the part, and no superfluous material needs to be removed.

The FFF process is generally carried out as follows: a machine is employed which comprises a material supply unit, a heating element for heating the polymeric material to a melt-flowable state, a driver for directing the polymeric melt to a nozzle, and print head with a nozzle comprising an opening for dispensing molten polymeric material. A platform is also present to receive the material dispensed through the opening in the nozzle. The print head or the platform or both may be movable, thus allowing the material to be dispensed in the amount and pattern in accordance with computer data corresponding to the shape of the desired three-dimensional object. A filament of a polymer composition is supplied from a coil of such filament to an extrusion nozzle. In many FFF machines, the filament is pushed into the print head at a controlled rate, by for instance a worm-drive gear system or a pair of profiled wheels. The print head may be heated to melt the filament with the molten filament then being selectively deposited by an extrusion nozzle of the print head, normally on a substrate for the first layer and after that at the growing shaped object. After the deposition the polymer composition solidifies. An examples of such a method and apparatus is for example disclosed in WO15019212.

A problem with the known methods, is that if a polyamide is used, the process is limited to a very strict processing window, as the polyamide easily solidifies, or does not form a strong bond between the deposited layers. A solution to this problem has been proposed in WO2014/081594, in which a blend of a semi-crystalline polyamide and an amorphous polyamide is proposed. However, these blends have the disadvantage that the mechanical properties of the blend are insufficient, which restricts the use of the products obtained by these blends. Another disadvantage of WO2014/081594 is that the processing window may still be limited if low amounts of amorphous polyamides are used in the blend. Being able to vary the processing window in terms of variable printing speed and variable deposition time is useful for producing products of different size with good properties. It is also important that the properties of a printed product remain homogeneous in a part, regardless of the speed and path of the print head.

It is thus an object of the present invention to provide a method for forming a three-dimensional object by fused filament fabrication, which allows better mechanical properties and/or an improved process window.

This object has been achieved by a method for forming a three-dimensional object by fused filament fabrication comprising the step of selectively dispensing a polymer composition containing a semi-crystalline copolyamide in accordance with the shape of a portion of a three-dimensional object wherein the semi-crystalline copolyamide comprises:
  a) At least 70 wt. % of aliphatic monomeric units derived from
     i. aminoacid A, or
     ii. diamine B and diacid C, and
  b) At least 0.5 wt. % of further monomeric units derived from a cyclic monomer.

wherein the weight percentage (wt. %) is with respect to the total weight of the semi-crystalline copolyamide.

The method for forming a three-dimensional object by fused filament fabrication is known to a person skilled in the art and comprises at least a step of selectively dispensing a composition in accordance with the shape of a portion of a three-dimensional object. Dispensing usually is performed in a molten state of the composition. Prior to dispensing, the composition may thus be heated to above its melting temperature. After dispensing, the composition usually is allowed to cool down until it solidifies, thereby forming the three-dimensional object.

Surprisingly, it has been found that when a semi-crystalline copolyamide as according to the invention is employed, the mechanical properties remain similar as compared to a polyamide not containing the further monomeric units. Moreover, the processing window is also broadened as compared to a polyamide not containing the further monomeric units.

With "semi-crystalline" is herein understood a copolyamide having a melting enthalpy of at least 20 Joules/gram, using differential scanning calorimetry (DSC) pursuant to ASTM D3418-08 in the second heating run with a heating rate of 10° C./min. Suitably, melting enthalpy is in the range of 20-100 Joules/gram, more particular in the range of 25-75 Joules/gram.

With "amorphous" is herein understood to be a copolyamide that has a melting enthalpy of less than 20 Joules/gram.

With "homopolyamide" is herein understood to be a polyamide which consists of monomeric units derived from
  Aminoacid A, or
  Diamine B and diacid C.

A homopolyamide may contain minor amounts of other units, not belonging to the class of aminoacids, diamines or diacids, such as mono-acids or mono-amines. A homopolyamide may also be referred to as PA-A, or PA-BC.

A copolyamide may be referred to as for example PA-A/MN, or PA-BC/MN, or PA-NQ, or PA-BC/Q, in which the various letters denote monomeric units derived from different types of aminoacids (A and Q), diamines (B or M) or diacids (C or N). If more than two different types of monomeric units are present, the nomenclature for a copolyamide may be for example PA-A/MN/XY.

Blends of polyamides are denoted as PA-A/PA-BC, in which a "/" is placed between the two types of polyamides which are blended.

Nomenclature for polyamides and copolyamides is as described in Nylon Plastics Handbook, Melvin I. Kohan, Hanser Publishers, 1995, page 5.

With "copolyamide" is herein understood to be a polymer derived from mixing monomers and polymerizing those into a polymer, in contrast to mixing polymers and reacting those into other polymers.

With monomeric unit is herein understood the largest constitutional unit that a single monomer molecule contributes to the structure of the polymer.

With repeat unit is herein understood the smallest constitutional unit that constitutes a regular polymer chain.

A repeat unit derived from caprolactam is also known by the chemical formula (1):

$$—HN(CH_2)_5CO— \qquad (1)$$

A repeat unit composed of the monomeric units derived from hexamethylene diamine and adipic acid is also known by the chemical formula (2), and may also be derived from the salt of hexamethylene diamine and adipic acid:

$$—HN(CH_2)_6NHCO(CH_2)_4CO— \qquad (2)$$

Repeat units derived from an aminoacid include lactams, which will upon ring opening constitute an aminoacid.

The at least 70 wt. % of aliphatic monomeric units derived from
  i. aminoacid A, or
  ii. diamine B and diacid C,
may be chosen from a broad range of aliphatic monomeric units.

Amino acid A may for example be epsilon-caprolactam, aminodecanoic acid, aminoundecanoic acid and aminodo-decanoic acid.

Diamine B may be chosen from for example 1,4-diaminobutane, 1,5-diaminopentane, 1,6-diaminohexane.

Diacid C may be chosen from for example 1,6-hexanedioic acid, 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid and 1,18-octadecanedioic acid.

Preferably, the aliphatic monomeric units constitute a polyamide such as PA-6/, PA-66/, PA-46/, PA-410/, PA-610/, PA-612/, PA-10/, PA-11/, PA-12/, PA-510/, PA-512/, in which the further monomeric units are listed after the "/".

Preferably, the aliphatic monomeric units are derived from monomers selected from the group consisting of epsilon-caprolactam, 1,4-diaminobutane and 1,10-decanedioic acid, 1,6-diaminohexane and 1,6-hexanedioic acid, as polyamides derived from these monomers are readily available and exhibit good mechanical properties.

Preferably, at least 75 wt. % of aliphatic monomeric units derived from A, or B and C, are present, and more preferably at least 80 wt. %.

The at least 0.5 wt. % further monomeric units are derived from a cyclic monomer. The further monomeric units may be derived from more than one type of cyclic monomer, as for example derived from at least two cyclic monomers or at least three or even at least four cyclic monomers."

"A monomer" is herein understood thus to be at least one monomer and may include more than one monomer.

With cyclic is understood that the monomeric unit as present in the polymer has a cyclic chemical structure, thus a ring-structure, such as a cyclic-aliphatic or aromatic structure. The cyclic structure may include carbon, nitrogen and oxygen atoms in the ring.

Cyclic monomeric units may be derived from a monomer selected from the group consisting of isophoronediamine (IPD), cis-1,4-diaminocyclohexane, trans-1,4-diaminocyclohexane, bis-(p-aminocyclohexane)methane (PACM), 2,2-Di-(4-aminocyclohexyl)-propane, 3,3'-dimethyl-4-4'-diaminodicyclohexylmethane (DMDC), p-xylylenediamine, m-xylylenediamine, 3,6-bis(aminomethyl)norbornane, isophthalic acid (I), terephthalic acid (T), 4-methylisophthalic acid, 4-tert-butylisophthalic acid, 1,4-naphthalenedicarboxylic acid and 2,6-naphthalenedicarboxylic acid, cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

The further monomeric units are present in a maximum amount of at most 30 wt. %, preferably at most 25 wt. %, and more preferred at most 20 wt. %. A lower maximum amount has the advantage that the mechanical properties are better retained, as compared to a homopolyamide, which is made of monomeric units derived from A, or B and C.

The advantage of the presence of at least one further monomeric unit being cyclic is that it requires a relative low amount of this monomeric unit to achieve a significant effect on the processing behavior of the polyamide composition. This has the further advantage that the mechanical properties remain more similar as compared to a polyamide in which the cyclic further monomeric unit is not present.

Preferably, all of the further monomeric units are cyclic, as this allows even a smaller amount of further monomeric units, and preferably between 0.5 to 10 wt. % of further cyclic monomeric units are present with respect to the total weight of the semi-crystalline copolyamide, more preferred between 0.8 to 7 wt. % and most preferred between 0.8 and 3 wt. %. The advantage of the presence of cyclic monomeric unit in such lower amount is that a similar effect on the processing is achieved, while the mechanical properties remain more similar as compared to a polyamide in which the cyclic further monomeric unit is not present.

The semi-crystalline copolyamides suitable are for example PA-6/IPDT in which there is between 0.5 and 10 wt. % of isophoronediamine (IPD) and terephthalic acid (T) components present in the semi-crystalline copolyamide, more preferably between 0.8 to 7 wt. % and even more preferred between 0.8 and 3 wt. %. This semi-crystalline copolyamide exhibits good mechanical properties and a broad processing window.

Other semi-crystalline copolyamides suitable are for example PA-6/6T, PA-410/IPDT, PA-410/6T, PA-410/IPDT, PA-410/DMDCT, PA-6/DMDCT, PA-66/DMDCT, PA-66/IPDT, PA-6/IPDI, in which the monomeric units falling under a) are denoted before the "I" and the monomeric units falling under b) are usually denoted after the "/".

In a preferred embodiment, the further monomeric units derived from a cyclic monomer comprise isophorone diamine and terephthalic acid.

The semi-crystalline copolyamide may also be a blend of two or more semi-crystalline copolyamides.

Preferably, the viscosity number is between 100 and 300. The viscosity number is determined according to ISO 307 Fifth edition 2007 May 15 by dissolving the semi-crystalline copolyamide in 90% formic acid (c=0.005 g/mL) at 25° C. and measuring of the viscosity number with the aid of an Ubelohde viscometer (Scott type 530-10/1), with the relationship between viscosity number and relative viscosity being VN=200*(relative viscosity−1). A higher viscosity leads to better bridging properties. Bridging in FFF is printing a flat, horizontal part of an object in mid-air, without the use of any support structure.

The polymer composition preferably comprises at least 30 wt. % of the semi-crystalline copolyamide as disclosed above, more preferably at least 40 wt. % and even more preferred at least 50 wt. % and most preferred at least 60 wt. %, with respect to the total weight of polymer composition. The polymer may also consist of semi-crystalline copolyamide, in which case it may be referred to as a polymer.

The polymer composition may contain other ingredients such as impact modifier, reinforcement, colorants.

The filament required for fused filament fabrication can be prepared by well-known extrusion processes for that purposes. Normally the filament is a monofilament. The diameter of the filament may be between 1 and 3.5 mm, is preferably between 1.5 and 3 mm.

Without wishing to be bound by theory, the inventors believe that by copolymerization the monomers into a semi-crystalline copolyamide, the crystallization speed of the resultant semi-crystalline copolyamide according to the preferred composition decreases, which is favorable for fused filament fabrication. Surprisingly, a semi-crystalline copolyamide is more effective than blending of polyamides with similar preferred composition.

The process according to the invention for forming a three-dimensional object comprises the step of selectively dispensing a polymer composition containing a semi-crystalline copolyamide in accordance with the shape of a portion of a three-dimensional object. Herein a molten filament is formed and the molten filament is deposited to form a three-dimensional object.

The process according to the invention suitably comprises the following steps:
  a filament of a polymer composition is supplied from a coil, a spool or a bobbin of such filament to a print head with an extrusion nozzle.
  the filament is pushed into the print head at a controlled rate,
  the print head is heated to melt the filament
  the molten filament is then being deposited by the extrusion nozzle of the print head, with a first layer on a substrate to form the beginning of a growing shaped part and with further layers on the growing shaped part,
  wherein after deposition the polymer composition cools and solidifies, thereby forming the forming the three-dimensional object.

In an alternative embodiment of the invention, the filament is produced as a molten filament by melt-extrusion of a granulate material comprising the polymer composition. Suitably, the process comprises steps wherein:
  the granulate material is fed to a melt-extrusion apparatus comprising an extrusion head with an extrusion nozzle,
  the granulate material is melted in the melt-extrusion apparatus and fed to the extrusion head at a controlled rate;
  the molten material is extruded through the extrusion nozzle thereby forming a molten filament;
  the molten filament is then being deposited by the extrusion nozzle of the print head, with a first layer on a substrate to form the beginning of a growing shaped part and with further layers on the growing shaped part,
  wherein after deposition the polymer composition cools and solidifies, thereby forming the forming the three-dimensional object.

During the solidification of the polymer composition, also the final properties of the shaped object will develop.

In the process according to the invention, the printing speed is suitably at least 10 mm/s, for example in the range of 20-75 mm/s, preferably at least 20 mm/s, for example in the range of 20-50 mm/s.

Figure 1:
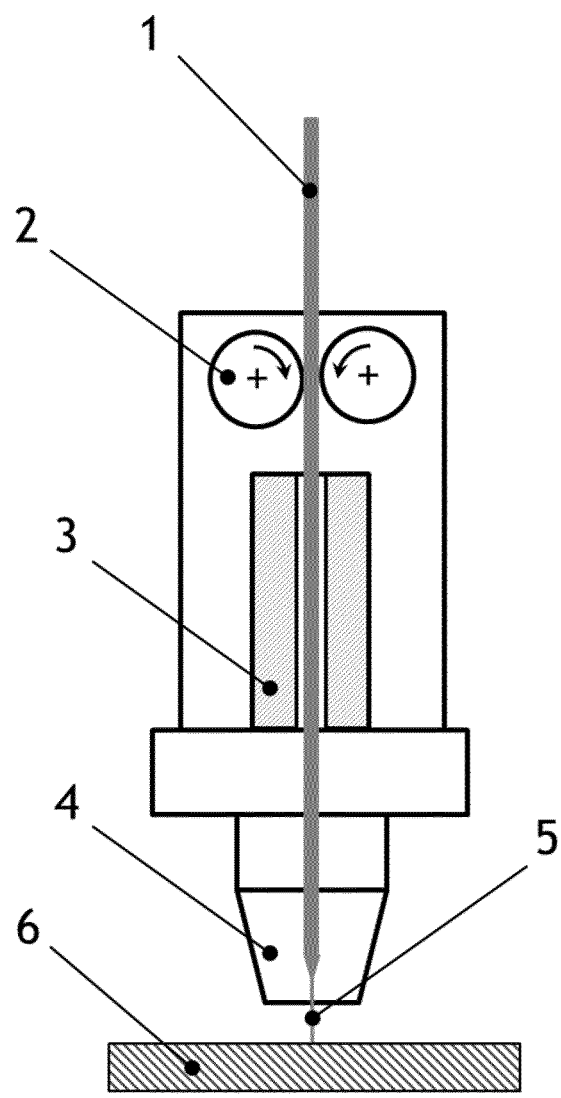
FIG. 1 shows a schematic view of an example of a print head of an FFF apparatus that may be used in the method according to the invention and a substrate.

FIG. 1 shows a schematic view of an example of a print head of an FFF apparatus that may be used in the method according to the invention. A filament (1) is transported from a reel (not shown) by a pair of wheels (2) into an oven (3) of the print head, for melting the filament. The molten material of the filament flows through de nozzle (4). Pressure to obtain this flow is obtained by force applied by the pair of wheels to the filament and yet un-molten filament acting as a piston in the first part of the oven. The extrudate (5) leaving the nozzle is deposited on the substrate (6), respectively the object being formed, positioned below the nozzle.

Figure 2:
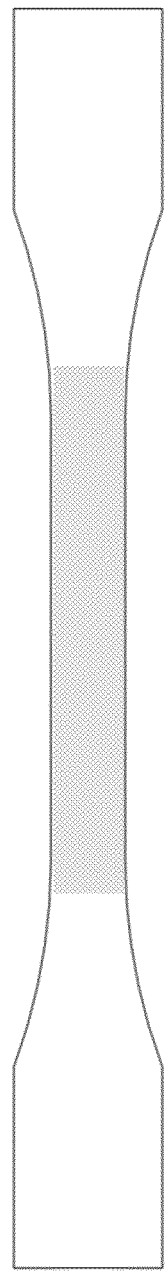
FIG. 2 shows a printed test specimen.

FIG. 2 shows a test specimen for determining the strain at break (4).

Figure 3:
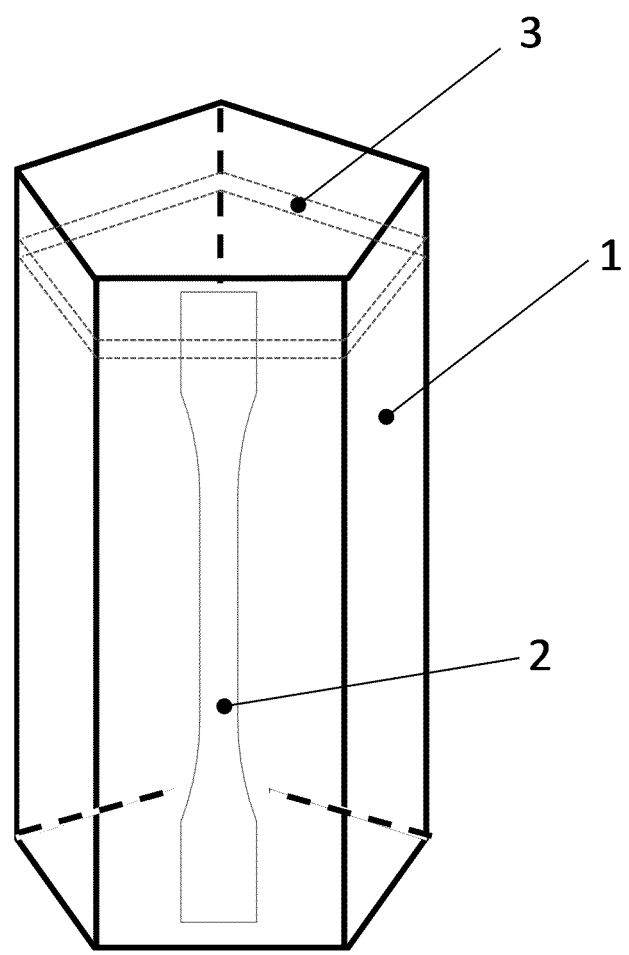
FIG. 3 shows the single perimeter object and location of test specimen.

FIG. 3 shows the schematic representation of a pentagonic shaped printed single perimeter object (1) consisting of just one track (perimeter) deposited in the height direction on top of each other as depicted schematically by the dotted lines (3). The tensile test specimens (2) are located in each section of the pentagonic shape. They are punched out of the prints prior to determination of the tensile properties.

EXPERIMENTS

Materials Used:
PA12; product data from datasheet in Stratasys FDM Nylon 12™ (Eden Priairie, US)
PA-6 homopolymer; viscosity number of 220.
PA-6 copolymer: PA-6/IPDT, in which 1 wt. % IPDT is present; viscosity number of 220.
PA-6I/6T; amorphous copolyamide in which I/T is 7/3; viscosity number 40.
PA-6/66 copolymer Comparative Experiment A For PA12, the values in the datasheet of Stratasys FDM Nylon 12™ (Eden Priairie, US) were used. Herein test bars were prepared by printing in a horizontal plane (XY), where X is coinciding with the length direction, Y the thickness direction and Z the width direction of the test bars respectively, often named "on-edge" (ZX) orientation. Tensile properties were measured in XZ-direction, i.e. testing direction is in printing direction. The data are listed in Table 1.

Comparative Experiment B

A filament of PA-6 homopolymer having a diameter of 1.75 mm was printed into tensile test specimens of type ISO527BA with a Cartesio 3D-printer manufactured by MaukCC, Maastricht, The Netherlands. A schematic view of such a printer is shown in FIG. 1. The temperature of the oven was 260° C., the diameter of the nozzle was 0.4 mm and the substrate temperature 80° C. The extrudate leaving the nozzle was deposited in a layer by layer way on the substrate where the tracks has an alternating 45°/−45° angle relative to the testing direction, leaving a pattern as shown in FIG. 2.

After conditioning at ambient conditions (23° C., 50% rel. humidity) for at least 3 days, the mechanical properties, Young's modulus, stress at break and elongation at break are determined in a tensile tester using a cross-head speed of 50 m/min according to ISO527. The results (average of 3 specimens) are summarized in Table 1.

Comparative Experiment C

As comparative Experiment B, but now a blend of 80/20 wt/wt. % of PA6 homopolymer and PA-6I/6T was extruded into filament of 1.75 mm diameter and printed into tensile test specimens using the same conditions. The results (average of 3 specimens) are summarized in Table 1.

Example 1

As comparative Experiment B, but now a PA-6/IPDT copolymer was used, in which 1 wt. % of IPDT is present. The results (average of 3 specimens) are summarized in Table 1.

TABLE 1 mechanical data

| | | Modulus [MPa] | Stress at break [MPa] | Strain at break [%] |
|---|---|---|---|---|
| Comp. Experiment A | PA12 | 1282 | 46.0 | 30 |
| Comp. Experiment B | PA-6 | 2159 ± 121 | 60.8 ± 2.0 | 13.5 ± 3.6 |
| Comp. Experiment C | Blend of PA-6 and PA-6I/6T | 2089 ± 319 | 56.5 ± 2.3 | 2.9 ± 0.3 |
| Example I | PA-6/IPDT | 1940 ± 333 | 56.0 ± 5.4 | 10.9 ± 8.5 |

The results in Table 1 show that the copolymer of Example I has better mechanical properties than PA12 in Comparative Experiment A. In comparison with PA12, the copolymer has a significant higher tensile properties for the modulus and stress at break. The modulus and stress at break of the copolymer of Example I are comparable to the homopolymer of Comparative Experiment B and the blend of Comparative Experiment C, while the strain at break of Example I is comparable to the homopolymer of Comparative Experiment B and much better as compared to the blend Comparative Experiment C.

Single Perimeter Objects, Tested in z-Direction (ISO 527 1BA), Printed at a Temperature of Tm+40° C.

Example II

Single perimeter objects with extended pentagon shape were prepared by printing copolymer PA-6/IPDT at various printing speeds ranging from 10 to 50 mm/s. A filament of copolymer having a diameter of 1.75 mm was printed with a Cartesio 3D-printer manufactured by MaukCC, Maastricht, The Netherlands. The temperature of the oven was 260° C., the diameter of the nozzle was 0.4 mm and the substrate temperature 80° C. The extrudate leaving the nozzle was deposited in a layer by layer way on the substrate, growing the object in vertical direction (z-axis). Small tensile bars (ISO 527 1 BA) were punched out the printed objects in the length direction (z-axis). Thus tensile tests were performed in z-direction perpendicular to the printing direction. The results are shown in Table 2.

Comparative Experiment D

Example II was repeated except that instead of PA-6/IPDT, the PA-6 homopolymer was used. The melt temperature was set at 260° C. The results are shown in Table 2.

Comparative Experiment E

Example II was repeated except that instead of PA-6/IPDT, a PA-6/66 copolymer was used. The melt temperature was set at 240° C. Printing at lower speed went OK, at higher speed was problematic. At a speed of 40 mm/s or higher the melt layers were not deposited consistently on top of each other. Raising the temperature gave some improvement, but the printed layer started to flow before the next layer was deposited. So, tensile data at these speeds could not be determined. The qualitative good products (up to 30 mm/s) were tested. The results are shown in Table 2.

TABLE 2

Results of mechanical tests for Example II and Comparative Experiments D and E and different printing speeds

| | 10 mm/s | 20 mm/s | 30 mm/s | 40 mm/s | 50 mm/s |
|---|---|---|---|---|---|
| EX-II | | | | | |
| TM [MPa] | 1573 ± 73 | 1751 ± 54 | 1834 ± 33 | 1905 ± 51 | 1793 ± 74 |
| TS max[MPa] | 41.5 ± 0.8 | 44.9 ± 0.9 | 44.9 ± 1.1 | 44.3 ± 1.5 | 41.4 ± 1.1 |
| EaB [%] | 7.2 ± 2.0 | 9.9 ± 3.9 | 8.5 ± 1.8 | 5.7 ± 1.3 | 4.7 ± 0.9 |
| EaY [%] | 3.6 ± 0.2 | 3.6 ± 0.2 | 3.8 ± 0.0 | 3.3 ± 0.1 | 3.3 ± 0.1 |
| CE-D | | | | | |
| TM [MPa] | 921 ± 186 | 1183 ± 120 | 1283 ± 113 | 1272 ± 64 | 1724 ± 59 |
| TS max[MPa] | 21.6 ± 12 | 37.5 ± 1.7 | 37.2 ± 2.3 | 34.1 ± 0.7 | 21.7 ± 12 |
| EaB [%] | 5.3 ± 7.7 | 3.9 ± 0.8 | 6.3 ± 1.7 | 4.8 ± 0.6 | 1.0 ± 0.8 |
| EaY [%] | n.a. | n.a. | n.a. | n.a. | n.a. |

TABLE 2-continued

Results of mechanical tests for Example II and Comparative
Experiments D and E and different printing speeds

|  | 10 mm/s | 20 mm/s | 30 mm/s | 40 mm/s | 50 mm/s |
|---|---|---|---|---|---|
| CE-E |  |  |  |  |  |
| TM [MPa] | 1250 ± 81 | 1555 ± 175 | 1511 ± 116 | n.a. | n.a. |
| TS max[MPa] | 29.8 ± 1.7 | 43.8 ± 0.8 | 34.4 ± 9.7 | n.a. | n.a. |
| EaB [%] | 3.4 ± 1.6 | 4.9 ± 0.1 | 2.9 ± 1.4 | n.a. | n.a. |
| EaY [%] | n.a. | n.a. | n.a. | n.a. | n.a. |

It was expected that at low speeds, where it takes longer before the next layer is deposited and the printed layer would cool down more, as a consequence, the fusion would be less complete than at faster speed resulting in shorter time and higher temperature. At the same time, however, the temperature of the melt leaving the nozzle at lower speeds is higher and more homogeneous than at higher speed. Therefore, there was also expected to observe an optimum in the processing in terms of speed for each of the materials.

As a surprise the copolymer in Example II showed a very good performance over the whole speed range. All test bars of the resulting products showed a yielding behavior and Tensile Modulus and Tensile Strength are high at all speeds applied. Elongation at break is high as well, only somewhat lower at the highest speed.

The homopolymer in Comparative Experiment D showed a brittle failure behavior with a much lower Tensile Modulus and Tensile Strength at 10 to 40 mm/sec, compared to Example II, and at 50 mm/s the Tensile Modulus is as high as that of Example II, but Tensile Strength and Elongation at break are much lower.

The PA-6/66 copolymer of Comparative Experiment E could not be processed at 40 and 50 mm/s. Furthermore, at 10 to 30 mm/s, the copolymer of Comparative Experiment E showed a brittle failure behavior with a much lower Tensile Modulus, Tensile and Elongation at Break, compared to Example II.

Thus printing while employing PA-6/IPDT (Example II) allowed a broader processing window and resulted in products with better mechanical properties and less warpage or curling is to be expected as compared to Comparative Experiment D and E.

The invention claimed is:

1. A method for forming a three-dimensional object by fused filament fabrication comprising the step of selectively dispensing a polymer composition containing a semi-crystalline copolyamide in accordance with the shape of a portion of a three-dimensional object, wherein the semi-crystalline copolyamide comprises:
   a) at least 70 wt. % of aliphatic monomeric units derived from
      i. aminoacid A, or
      ii. diamine B and diacid C, and
   b) at least 0.5 wt. % of further monomeric units derived from a cyclic monomer, wherein the weight percentage (wt. %) is with respect to the total weight of the semi-crystalline copolyamide.

2. The method according to claim 1, wherein the polymer composition comprises at least 30 wt. % of the semi-crystalline copolyamide, wherein wt. % is with respect to the total weight of the polymer composition.

3. The method according to claim 1, wherein the aliphatic monomeric units are derived from a monomer selected from the group consisting of epsilon-caprolactam, 1,4-diaminobutane and 1,10-decanedioic acid, 1,6-diaminohexane and 1,6-hexanedioic acid.

4. The method according to claim 1, wherein the cyclic monomer is an aromatic monomer, or a cycloaliphatic monomer, or a combination thereof.

5. The method according to claim 1, wherein the cyclic monomer is selected from the group consisting of isophoronediamine (IPD), cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

6. The method according to claim 1, wherein the aliphatic monomeric units derived from A, or B and C, are selected from the group of monomers consisting of epsilon caprolactam, 1,4-diaminobutane and 1,10-decanedioic acid, 1,6-diaminohexane and 1,6-hexanedioic acid and the further monomeric units derived from a cyclic monomer are selected from the group of monomers consisting of isophoronediamine (IPD), cis-1,4-diaminocyclohexane, trans-1,4-diaminocyclohexane, bis-(p-aminocyclohexane)methane (PACM), 2,2-Di-(4-aminocyclohexyl)-propane, 3,3'-dimethyl-4-4'-diaminodicyclohexylmethane (DMDC), p-xylylenediamine, m-xylylenediamine, 3,6-bis(aminomethyl)norbornane, isophthalic acid (I), terephthalic acid (T), 4-methylisophthalic acid, 4-tert-butylisophthalic acid, 1,4-naphthalenedicarboxylic acid, 2,6-naphthalenedicarboxylic acid, cis-1,4-cyclohexanedicarboxylic acid, trans-1,4-cyclohexanedicarboxylic acid, cis-1,3-cyclohexanedicarboxylic acid and trans-1,3-cyclohexanedicarboxylic acid.

7. The method according to claim 1, wherein the printing speed is at least 10 mm/s.

8. The method according to claim 1, wherein the further monomeric units derived from a cyclic monomer comprise isophorone diamine and terephthalic acid.

9. The method according to claim 1, wherein the filament is supplied from a coil.

10. The method according to claim 1, wherein the filament is produced by melt-extrusion of a granulate material comprising the polymer composition.

11. The method according to claim 1, wherein aminoacid A comprises epsilon-caprolactam, aminodecanoic acid, aminoundecanoic acid, or aminododecanoic acid.

12. The method according to claim 11, wherein diamine B comprises 1,4-diaminobutane, 1,5-diaminopentane, or 1,6-diaminohexane.

13. The method according to claim 12, wherein diacid C comprises 1,6-hexanedioic acid, 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, or 1,18-octadecanedioic acid.

14. The method of claim 13, wherein the cyclic monomer comprises isophoronediamine (IPD), cis-1,4-diaminocyclohexane, trans-1,4-diaminocyclohexane, bis-(p-aminocyclohexane)methane (PACM), 2,2-Di-(4-aminocyclohexyl)-propane, 3,3'-dimethyl-4-4'-diaminodicyclohexylmethane (DMDC), p-xylylenediamine, m-xylylenediamine, 3,6-bis(aminomethyl)norbornane, isophthalic acid (I), terephthalic acid (T), 4-methylisophthalic acid, 4-tert-butylisophthalic acid, 1,4-naphthalenedicarboxylic acid and 2,6-naphthalenedicarboxylic acid, ¬cis-1,4-cyclohexanedicarboxylic acid, trans-1,4-cyclohexanedicarboxylic acid, cis-1,3-cyclohexanedicarboxylic acid, or trans-1,3-cyclohexanedicarboxylic acid.

15. The method of claim 14, wherein the semi-crystalline copolyamide comprises between 0.8 to 7 wt. % of further monomeric units derived from at least two different cyclic monomers.

16. The method of claim 1, wherein the semi-crystalline copolyamide comprises at least 80 wt. % of aliphatic monomeric units derived from
   i. aminoacid A, or
   ii. diamine B and diacid C; and
   between 0.8 to 3 wt. % of further monomeric units derived from a cyclic monomer.

17. The method of claim 16, wherein the polymer composition comprises at least 60 wt. % of the semi-crystalline polyamide, relative to the total weight of the polymer composition.

18. The method of claim 1, wherein the polymer composition consists of the semi-crystalline copolyamide.

* * * * *